United States Patent
Beacom

(10) Patent No.: US 6,845,558 B2
(45) Date of Patent: Jan. 25, 2005

(54) METHOD OF FABRICATING VANES

(75) Inventor: William F. Beacom, Jupiter, FL (US)

(73) Assignee: Elliott Energy Systems, Inc., Stuart, FL (US)

( * ) Notice: Subject to any disclaimer, the term of this patent is extended or adjusted under 35 U.S.C. 154(b) by 0 days.

(21) Appl. No.: 10/650,293

(22) Filed: Aug. 27, 2003

(65) Prior Publication Data

US 2004/0034998 A1 Feb. 26, 2004

Related U.S. Application Data

(62) Division of application No. 10/165,876, filed on Jun. 10, 2002, now Pat. No. 6,644,916.

(51) Int. Cl.$^7$ .............................. B23P 15/04; F01D 1/02
(52) U.S. Cl. .................. 29/889.21; 29/889.2; 29/889.7; 29/418; 403/12; 415/209.4; 415/191
(58) Field of Search .......................... 29/889.21, 889.2, 29/889.7, 418, 416, 417, 423; 403/12, 14; 415/209.4, 191, 210.1, 208.1, 208.2; 60/804, 752

(56) References Cited

U.S. PATENT DOCUMENTS

| | | | | | |
|---|---|---|---|---|---|
| 814,804 | A | * | 3/1906 | Rateau et al. | 29/889.7 |
| 3,284,881 | A | * | 11/1966 | Clarke | 29/889.22 |
| 4,743,165 | A | * | 5/1988 | Ulrich | 416/198 A |
| 5,146,679 | A | * | 9/1992 | Ortolano | 29/889.7 |
| 5,640,767 | A | * | 6/1997 | Jackson et al. | 29/889.721 |
| 2004/0003599 | A1 | * | 1/2004 | Ingram | 60/804 |

* cited by examiner

*Primary Examiner*—Marc Jimenez
(74) *Attorney, Agent, or Firm*—Norman Friedland

(57) ABSTRACT

This is a method for fabricating non rotating stator vanes that can be configured into a fixed stator vane or dam by forming a plurality of circumferentially spaced vanes extending from the peripheral edge(s) of an annular portion which portion is sacrificial in that after assembly it is removed. Assembling the vanes so that they are sandwiched between side plates and securing them in place. Thereafter removing the sacrificial portion. In one embodiment the vanes can be on the outer peripheral edge, in another embodiment the vanes can be on the inner peripheral edge or in a third embodiment the vanes can be on both edges. After assembly the fluid flowing between vanes are bounded by the side faces of the side plates. Hence in operation, fluid is bounded by adjacent vanes and the side plates. The vanes/side plates made by this method can also be formed in a linear configuration.

4 Claims, 4 Drawing Sheets

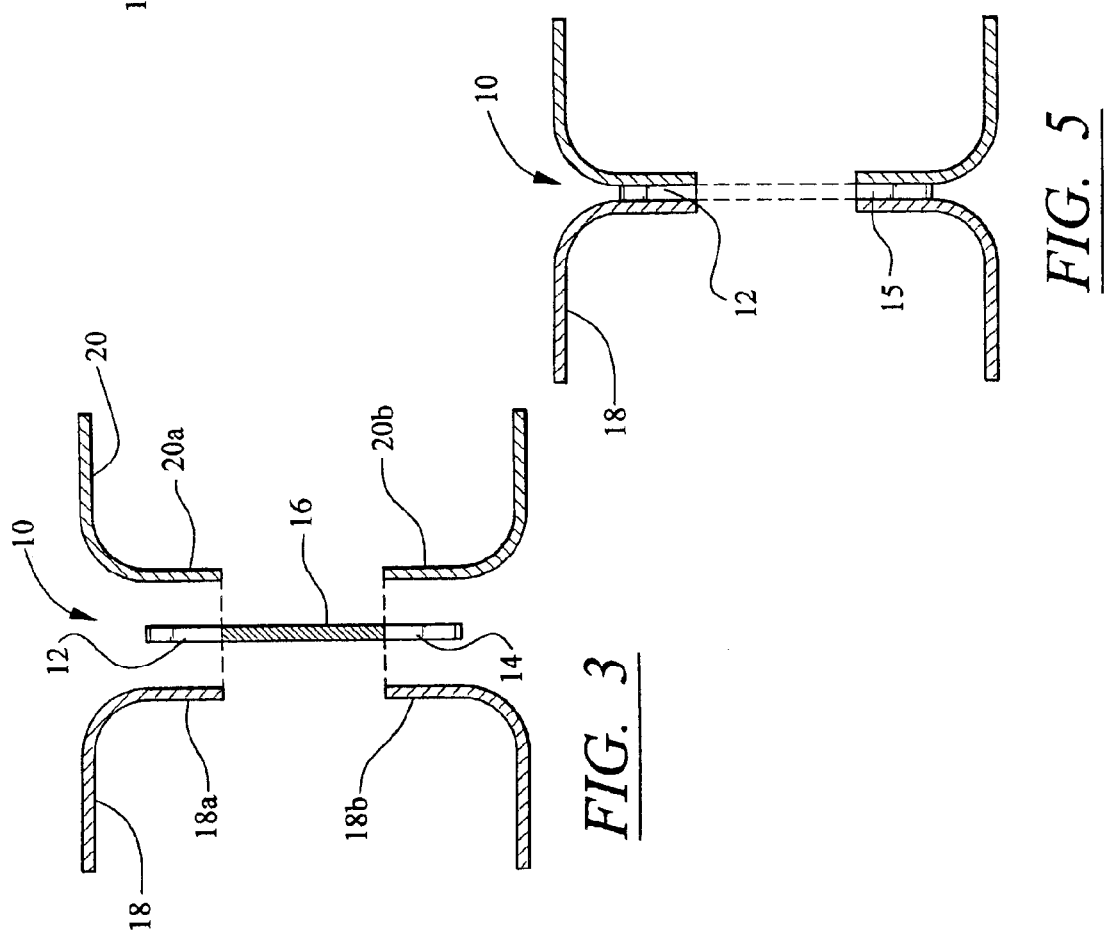

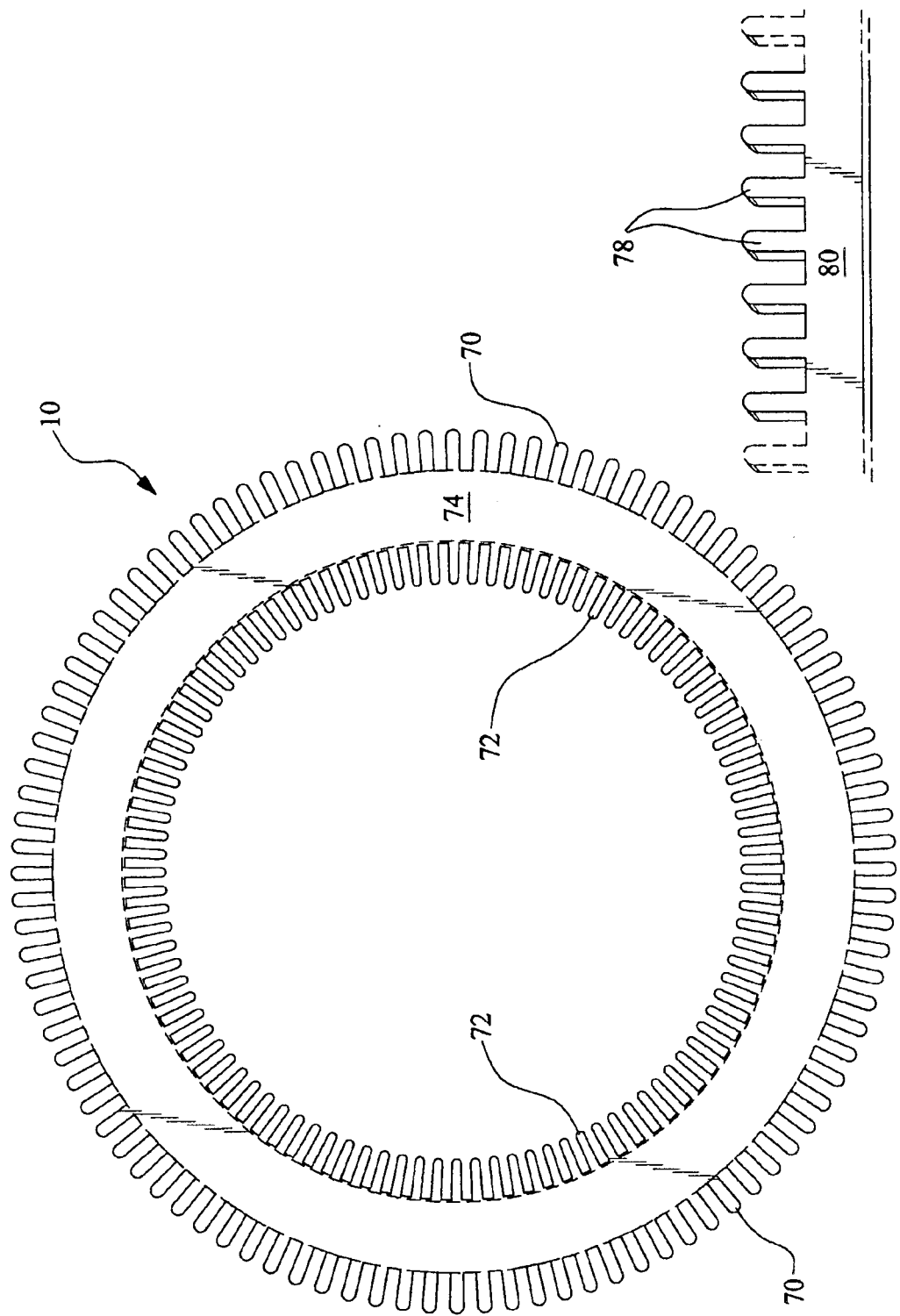

METHOD OF FABRICATING VANES

This is a divisional patent application of U.S. patent application Ser. No. 10/165,876 filed on Jun. 10, 2002 now U.S. Pat. No. 6,644,916.

TECHNICAL FIELD

This invention relates to vanes and more particularly to a vane construction utilized in fabricating a fluid passageway and the method of fabrication of a unit having vanes utilized therein.

BACKGROUND OF THE INVENTION

As one skilled in this field of technology appreciates, vanes have sundry uses in devices requiring fluid flows such as inlet guide vanes, stator vanes, turbine nozzle guide vanes, etc., where it is desirable to either impart a swirl to the fluid, remove the swirl from a fluid, and guide the flow into the rotating compressor or turbine, for guiding air into a combustor, etc. Obviously, the fluid medium can take the form of liquid, gas, etc. While this invention is particularly concerned with the vanes that are utilized in an annular configuration, it will be appreciated from the description to follow that these vanes and the construction thereof has utility in many applications.

When utilized in a burner application, particularly of the annular type of burner utilized in gas turbine engines, one skilled in this art will appreciate that in order to sustain combustion a recirculating zone is required and the recirculating zone is located in proximity to where ignition of the fuel/air mixture in the primary zone of the burner and combustion ensues. The primary zone assures continuous combustion after the igniter has been shut down although, in certain applications a continuous igniter remains during the complete operations of the burner. In some burners, for example, in an annular combustor utilized in microturbine engines manufactured by Elliott Energy Systems, Inc., the assignee of this patent application, the combustor utilizes a dam that extends inwardly toward the center line of the combustor. Air is admitted into the combustor through the vanes formed in the dam in proximity to the primary combustion zone, so that this air together with a small amount of air admitted therein in openings formed in the combustion liner adjacent to the fuel nozzles (that extend into the primary combustion zone) serve to define the recirculating zone. In the annular combustor of this mini jet engine the dam/vanes are mounted at the outer portion of the annular combustion zone or toward the outer combustor liner and the dam/vanes are mounted at the inner portion of the annular combustion zone or towards the inner combustion liner. In this application, the dam is made from two annular members, a forward facing annular member and a rearward facing annular member and the vanes are mounted therebetween. In other words, the vanes are circumferentially spaced defining a ring-like configuration. In fabricating the dam/vane configuration, each of the plurality of vanes are individually fabricated and are assembled in their respective positions sandwiched between the fore facing annular member and the aft facing annular member and this assembly is brazed forming a integral unit. This assembly can be fabricated in this manner before being mounted into the annular combustor or the assembly can be fabricated while held in the annular combustor. In either process, the assembly of the vanes in this manner is cumbersome, time consuming and obviously, expensive.

I have found that I can fabricate the dam/vane assembly by fabricating dam/vane in a much improved manner, making the process less cumbersome, requiring less time to assemble and less expensive. In accordance with this invention the vane member includes an inner set of circumferentially spaced vanes and an outer set of circumferentially spaced vanes held together by a hub defining a unitary unit. Both annular members of the dam are separately fabricated and are mounted so as to sandwich the vane/hub structure and brazed together to define an integral assembly. This assembly is then cut, removing the hub portion from the vanes and the complementary contiguous portions of the two dam members, thus leaving a torroidally shaped member with an annular passage way. The sets of vanes define air inlets for the outer portion of the liner and the inner portion of the liner.

It is apparent from the foregoing, that this is an improved method for fabricating a dam/vane unit and an annular combustor assembly, but it is also apparent to one skilled in this technology, that this method lends itself to the fabrication of other vane products. For example, the combustor described above can be fabricated with a single ring of vanes in either the outer dam or inner dam. The vane construction needn't be limited to an annular combustor. The vane constructed in accordance with this invention includes multi-options. The vanes need not be configured in a ring type of configuration, or the ring may be disposed at an angle relative to the center-line rather than being perpendicular thereto, the vane configuration can take many forms of mechanical configurations, as for example, a cone or a linear shape. What is important is that each of the vanes are held in position by a superficial material that serves to hold the vanes in position while being assembled and affixed in place and the superficial material is then removed. The vanes/superficial material configuration can by itself be a product that is manufactured and sold to others for use in their own products. These examples described in the immediate above paragraphs are merely used for explanation purposes and are not intended to be a limitation to the scope of this invention.

SUMMARY OF THE INVENTION

An object of this invention is to provide an improved method of fabricating vanes for admitting fluid into rotary machinery.

A feature of this invention is the method of fabricating vanes by providing the vanes attached to or made integrally with a disk or support member that is superficial in that it is removed once the vanes are assembled. The vanes are of the radially flow type and are sandwiched between annular or rectangular members so that when the disk or support member is removed the vanes become operative.

Another feature of this invention is the apparatus itself consisting of the vanes supported by a disk or support member made from a superficial material so that in assembly or sub-assembly the superficial material may be removed to leave the vanes in place for operational use.

Another feature of this invention is to fabricate a combustor for a gas turbine engine that includes a dam extending into the combustion chamber and the vanes are fabricated with a disk or support member made from a superficial material that is removable after the vanes are placed in the operative position. The vanes can be utilized in any shaped combustion chamber but when utilized in an annular combustor the vanes are located both in the outer periphery and inner periphery of the combustion chamber.

The vanes fabricated in accordance with this invention are characterized as being less expensive to fabricate, less expensive to assemble and are efficacious.

The foregoing and other features of the present invention will become more apparent from the following description and accompanying drawings.

BRIEF DESCRIPTION OF THE DRAWINGS

FIG. 3 is a sectional view in schematic illustrating one step in the method of fabrication of the vanes utilized in a dam for a combustor;

FIG. 4 is a sectional view in schematic illustrating another step in the method of fabricating the vanes dpicted in FIG. 1

FIG. 5 is a sectional view in schematic illustrating another step in the method of fabricating the vanes of this invention;

FIG. 6 is an end view plan view illustrating the details of the invention; and

FIG. 7 is a partial view illustrating another embodiment of this invention.

Figure 1:
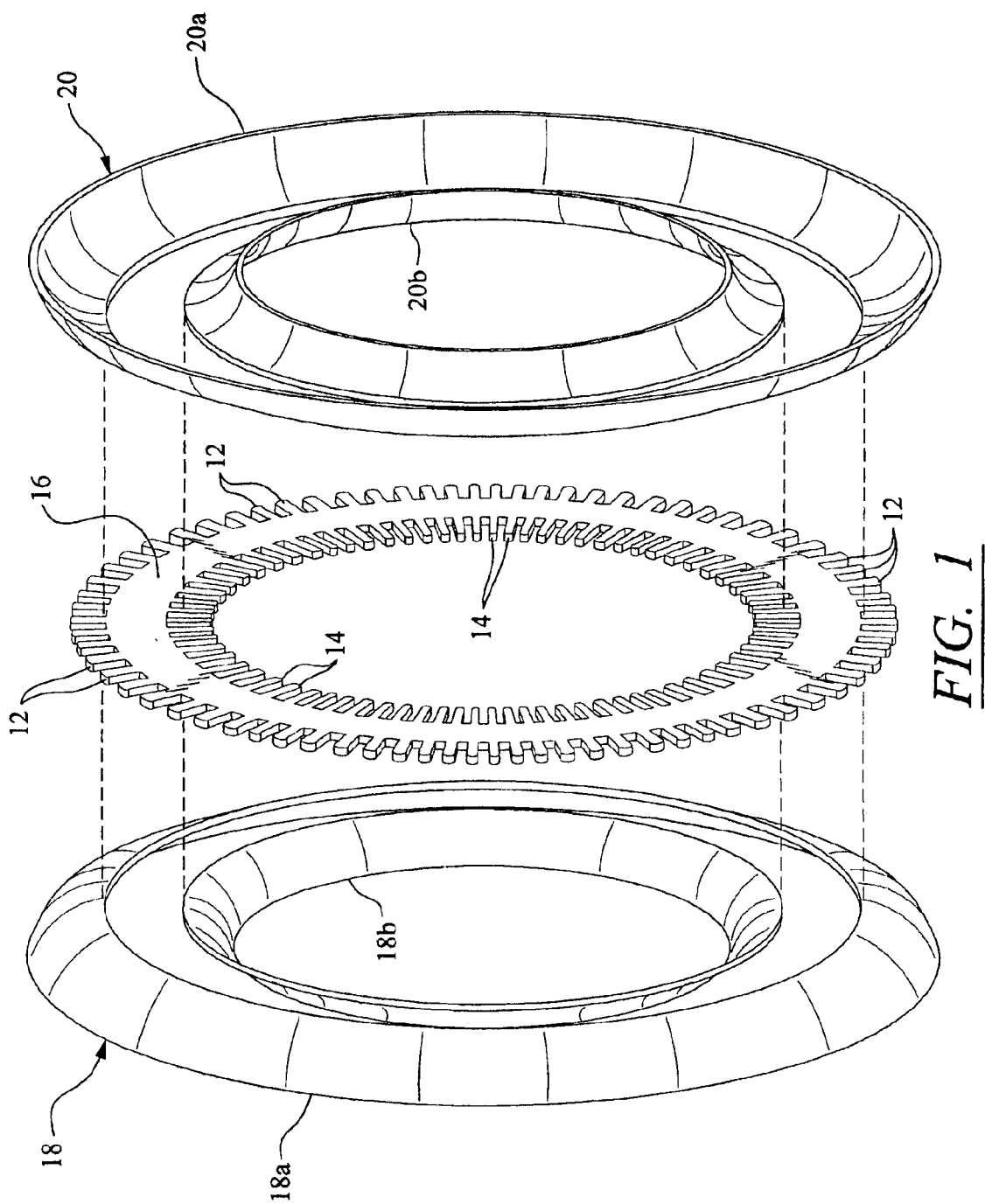
FIG. 1 is an exploded view in perspective illustrating the details of a vane of this invention which is fabricated to be utilized in an annular combustor.

These figures merely serve to further clarify and illustrate the present invention and are not intended to limit the scope thereof.

DETAILED DESCRIPTION OF THE INVENTION

One embodiment of this invention describes the preferred embodiment of the invention when utilized with an annular combustor, as one skilled in the art will appreciate, this type of vane has sundry uses, such as admitting fluid into rotary machinery such as a turbine, compressor, and the like and the invention is contemplated for any of these uses and the scope thereof should not be limited by this description. The material that holds the vanes in place, whether it be of the same material as the vanes or another material, is referred to herein as sacrificial material because it is eventually removed when the vanes are placed in their operative position. Also, as one skilled in this art will appreciate the vanes may take any configuration and may be fabricated by any well known process, such as machining, stamping, forging, etc.

The invention can best be understood by referring to FIGS. 1–6 which shows the vane apparatus generally illustrated by reference numeral 10 as having a plurality of outer diameter circumferentially spaced vanes 12 and the inner diameter circumferentially spaced vanes 14. The vanes are held in spatial relationship by the integral support member or disk 16. It is apparent from this FIG. 1 that the vanes are fabricated with an included sacrificial member; namely, the disk 16. It will be recognized that a vane fabricated in this manner can be made with any other configuration and that it can be utilized in other types of assembly for other uses. In this embodiment, the vanes are utilized in a dam that is utilized in an annular combustor that will be described in more detail hereinbelow.

The vane apparatus 10 is essentially like a ring with teeth, similar to a gear or sprocket-like configuration. To complete the vane, annular members or side plates 18 and 20 are assembled to the vane apparatus and united as an integral assembly by any well known means, such as brazing. In FIG. 1, the annular member 18 is formed in two annular disks 18a and 18b and the annular member on the opposite side of the vane apparatus 10 is the annular member 20, which like member 18, is fabricated in two annular disks 20a and 20b. Obviously, the annular disks 18 and 20 can each be fabricated as a single annular disk and assembled to the vane apparatus as described in the immediate above. Once assembled, the mid-annular portion of the vane apparatus is cut away by any known method, such as milling, grinding, turning, EDM, or the like. In the embodiment shown in FIG. 1, the upper annular portions 18a and 20a sandwich the upper vanes 12 and the lower annular portions 18b and 20b sandwich the inner vanes 14. Obviously, if the annular disks 18 and 20 were each integrally formed with the lower and upper diameter annular portions, the cutting operation would include the central annular portions of these disks.

Referring next to FIGS. 3–5, it is apparent that the method for fabricating the vanes 12 and 14 are as follows:

1) The vanes 12 and 14 are preformed including an annular disk 16. The vanes 12 can be preformed in any well known manner, such as machining, forging, stamping and the like. Likewise, the side plates 18 and 20 are preformed in any well known manner, such as machining stamping, forging, and the like;

2) the vanes 12, 14 and annular disk 16 are fitted to the side plates 18 and 20 and bonded in any well known manner, such as brazing;

3) the sacrificial material of the disk 16 is removed so that what remains are the vanes 12 in the upper diameter portion and the vanes 14 in the lower diameter portion;

4) the now assembled vanes, which are the dams 30 and 32 (see FIG. 2) of the combustion chamber 34 are installed or assembled in the annular combustor 36 by attaching it to the liner 38 by any well known means, such as welding, brazing and the like.

The method of fabricating the vaned dams for an annular combustor is merely illustrative of the fabrication of the vanes which, as mentioned above, would have utility in other applications.

Figure 2:
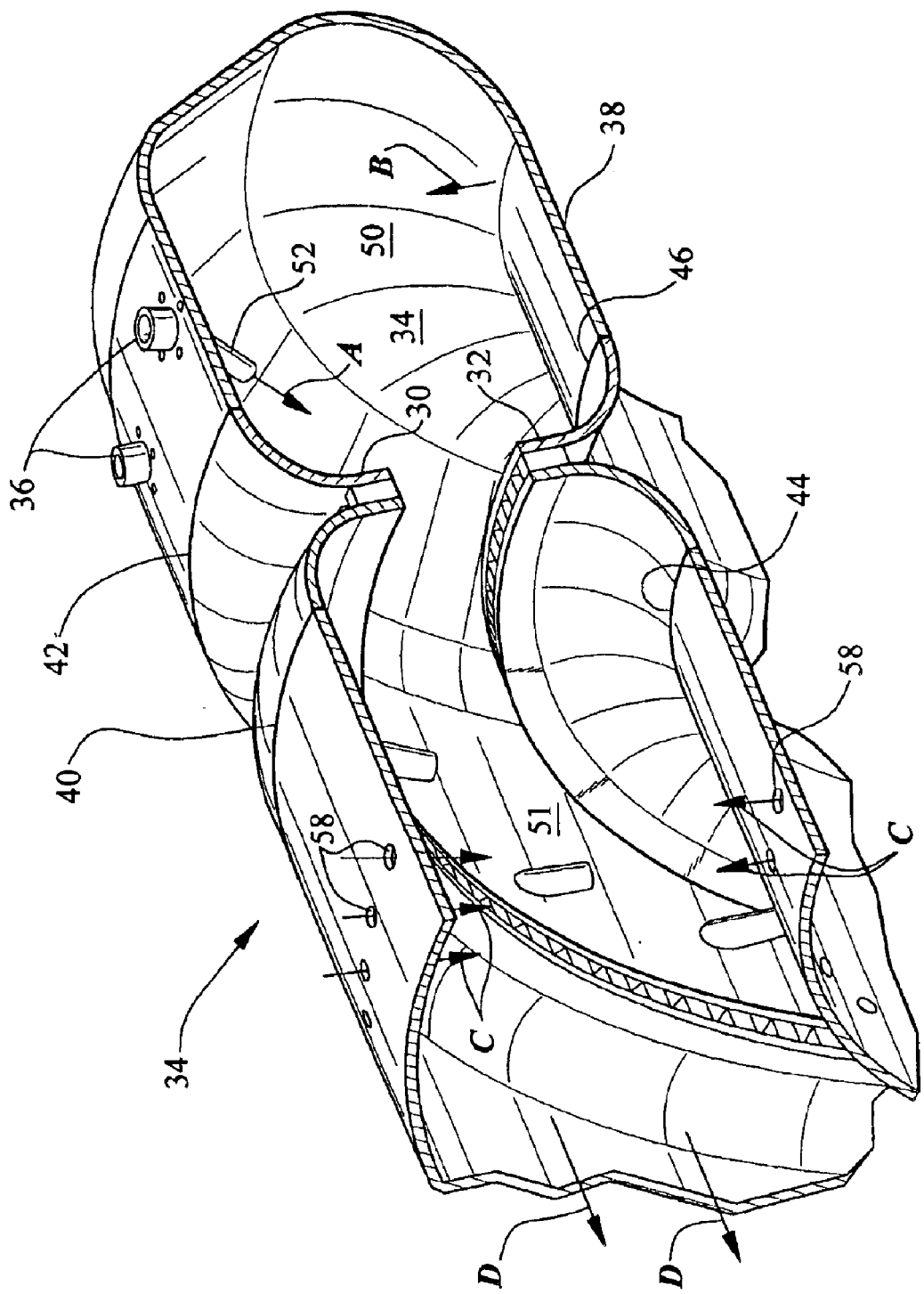
FIG. 2 is a fragmentary sectional view of the upper half of the annular combustor illustrating the dam and the included vanes of this invention.

Reference should be made to the annular combustor depicted in FIG. 2 which is a fragmentary perspective view of the annular combustor 36 with the dams 30 and 32 just described (in connection with FIGS. 1, 3–5) installed As is apparent from FIG. 2, the dam 30 is welded to liner 38 depicted by the weldment 40 and 42 and the dam 32 is welded to liner 38 depicted by the weldment 44 and 46. In this embodiment, the annular combustor comprises a primary combustion zone 50 where air is re-circulated to assure continuous combustion and the main or secondary combustion chamber 34. Fuel and a small portion of air illustrated by arrows A and B are admitted into the primary combustion zone 50 through any suitable commercially available fuel/air nozzles 52, the remaining portion of air illustrated by arrow C (admitted to the combustion chamber 34 via combustion holes 58 formed in the liner) enters the primary zone 50 between the dams 30 and 32. The combustion products illustrated by arrow D flow toward the exit or discharge end of the combustion chamber 34 and serve to power the turbine (not shown) of the gas turbine engine sometimes referred to as a microturbine engine.

FIGS. 6 and 7 depict embodiments where the vanes are united to sacrificial material to be later assembled where the sacrificial material is then removed, leaving the vanes in place for operative use. In FIG. 6, the vanes 70 and 72 are attached to the sacrificial disk 74 and are shown for use in an annular application where vanes are required in the lower diameter portion and upper diameter portion. Obviously, where the vane configuration is to be circular and not annular, only one set of circumferential vanes would be required. In FIG. 7 the vanes 78 are formed in a rectilinear assembly and united to the sacrificial member 80. The FIG. 7 example of a vane configuration is merely illustrative of the many options one has with this invention.

In heretofore known vane constructions, the vanes are individually made and are then held by a fixture and then affixed to the side walls. Alternatively, the vanes are milled out of the apparatus. In either situation, the fabrication of these heretofore known vanes is labor intensive and expensive in comparison the vanes fabricated in the method described in this patent application.

As is obvious to one skilled in this art, the vane dimensions, shape and angles can be configured to provide a given acceleration and pressure drop to the flow passing between adjacent vanes. The vanes can also be oriented to direct the flow in an given direction. For example, when the vanes are utilized to direct air into a combustor of a turbine type of power plant and in the event that there are localized hot spots in the vicinity of the vanes, the discharge from the vanes can be directed to these hot spots to improve the structural integrity of the structure being affected by the hot spots. Hence, the vane dimension, size and discharge angle can be selected to not only combat these hot spots, but can be optimized to improve the effectiveness of the combustor.

Although this invention has been shown and described with respect to detailed embodiments thereof, it will be appreciated and understood by those skilled in the art that various changes in form and detail thereof may be made without departing from the spirit and scope of the claimed invention.

It is claimed:

1. A method for fabricating a non rotating stator vane with circumferentially spaced vanes formed in a ring which are used for directing a fluid comprising the steps of:
   i) forming the vanes integrally with a circular shaped support member located on a peripheral edge of the vanes, which support member is made from sacrificial material;
   ii) providing a pair of diametrically opposed side plates;
   iii) affixing side edges of the vanes to side faces of the side plates so that the vanes are sandwiched between the pair of side plates formed in step ii;
   iv) removing the sacrificial material so that the fluid being directed between adjacent vanes is bounded by the adjacent vanes and the pair of side plates provided in step ii.

2. The method as claimed in claim 1 wherein the vanes are formed in an annulus that is torroidally shaped.

3. The method as claimed in claim 2 wherein the vanes are formed in an annulus with one set of circumferentially spaced vanes formed on the outer peripheral edge of the annulus and another set of circumferentially spaced vanes formed on the inner peripheral edge of the annulus and the side plates are formed in a complementary annulus that is torroidally shaped and one set of vanes are located on the outer diameter peripheral edge of the torroidally shaped complementary annulus of the side plates and the outer set of the vanes are formed on the inner diameter peripheral edge of the torroidally shaped complementary annulus of the side plates.

4. The method as claimed in claim 1 wherein the vanes are configured in a linear configuration.

* * * * *